(12) United States Patent
Walker

(10) Patent No.: US 7,881,977 B2
(45) Date of Patent: Feb. 1, 2011

(54) CONSTRUCTION BIDDING SYSTEM AND METHOD

(75) Inventor: Michael Walker, Oak Brook, IL (US)

(73) Assignee: Leasecorp, Inc., Oakbrook, IL (US)

( * ) Notice: Subject to any disclaimer, the term of this patent is extended or adjusted under 35 U.S.C. 154(b) by 375 days.

(21) Appl. No.: 11/933,737

(22) Filed: Nov. 1, 2007

(65) Prior Publication Data

US 2008/0103958 A1 May 1, 2008

Related U.S. Application Data

(60) Provisional application No. 60/856,225, filed on Nov. 1, 2006.

(51) Int. Cl.
*G06Q 30/00* (2006.01)
*G06F 17/30* (2006.01)

(52) U.S. Cl. .......................... 705/26; 705/27

(58) Field of Classification Search ............ 705/26, 705/27
See application file for complete search history.

(56) References Cited

U.S. PATENT DOCUMENTS

| | | |
|---|---|---|
| 6,393,410 B1 | 5/2002 | Thompson |
| 6,446,053 B1 | 9/2002 | Elliott |
| 6,581,040 B1 | 6/2003 | Wright et al. |
| 2001/0032172 A1 | 10/2001 | Moulinet et al. |
| 2001/0044768 A1* | 11/2001 | Wares ................ 705/37 |
| 2001/0056355 A1 | 12/2001 | Moriyama et al. |
| 2002/0073114 A1* | 6/2002 | Nicastro et al. ........ 707/500 |
| 2002/0082973 A1 | 6/2002 | Marbach et al. |
| 2002/0138391 A1 | 9/2002 | Kroeger |
| 2002/0156668 A1 | 10/2002 | Morrow et al. |

2003/0101127 A1 5/2003 Anfred (Continued)

FOREIGN PATENT DOCUMENTS

JP 2002032432 1/2002

(Continued)

OTHER PUBLICATIONS

Construction cost estimating support system, Arditi, David; Alnajjar, Ahmed; Vingert, Nicolas, Cost Engineering ? v44n10 ?pp. 17-25, Oct. 2002.*

(Continued)

*Primary Examiner*—Jeffrey A Smith
*Assistant Examiner*—Resha Desai
(74) *Attorney, Agent, or Firm*—R. Blake Johnston, Esq.; DLA Piper LLP (US)

(57) ABSTRACT

A construction bidding system and method includes manager, general contractor and subcontractor workstations that communicate with a server hosting a website over a network such as the Internet. The server also communicates with a number of databases. A manager enters project information into a project database and selects general contractors from a general contractor database. The manager sends each selected general contractor an invitation to bid. A general contractor receives the invitation to bid, reviews the project information and selects subcontractors from a subcontractor database. The general contractor sends each selected subcontractor an invitation to bid. A subcontractor receives the invitation to bid and responds with bid information that is entered in to a bid database. The general contractor uses the bid information from the subcontractors to prepare and submit a bid to the manager.

19 Claims, 23 Drawing Sheets

U.S. PATENT DOCUMENTS

| | | |
|---|---|---|
| 2003/0105726 A1 | 6/2003 | Itoh et al. |
| 2003/0200168 A1 | 10/2003 | Cullen, III et al. |
| 2003/0212627 A1 | 11/2003 | Burns et al. |
| 2003/0225683 A1 | 12/2003 | Hill et al. |
| 2004/0083157 A1 | 4/2004 | Sasser |
| 2004/0205014 A1 | 10/2004 | Kaltner |
| 2004/0215633 A1 | 10/2004 | Harris |
| 2005/0021449 A1 | 1/2005 | Sweeney |
| 2005/0251433 A1 | 11/2005 | Orifici et al. |
| 2006/0010081 A1 | 1/2006 | Williams |
| 2006/0069986 A1 | 3/2006 | Sandoval |
| 2006/0085322 A1 | 4/2006 | Crookshanks |
| 2006/0149658 A1 | 7/2006 | Cornelius |

FOREIGN PATENT DOCUMENTS

| | | |
|---|---|---|
| JP | 2002073779 | 3/2002 |
| JP | 2003141386 | 5/2003 |

OTHER PUBLICATIONS

International Search Report dated Apr. 28, 2008.

* cited by examiner

FIG. 4

| | HOME | SERVICES | ABOUT US | CONTACT US |
|---|---|---|---|---|

BIDCHAIN

Home

Welcome, Mike Walker
(Construction Manager)

Construction Manager Home

As a Construction Manager, you can use this screen to create and view your projects.

Click here to Create a New Project. ~36

Existing Projects

Below is a list of your existing projects. Click the project description link to view the details of each project.
Show: ○ Active ○ Inactive ○ All

34

| Description | Start Date | Finish Date | Status | # GCs Invited | # GCs Responded | Low Bid | High Bid |
|---|---|---|---|---|---|---|---|
| SWC Technology Partners | 05/01/2007 | 07/31/2007 | Open | 3 | 1 | $92,000 | $92,000 |
| Leasecorp, Ltd. | 04/01/2007 | 06/30/2007 | Open | 0 | 0 | $0 | $0 |
| XYZ Incorporated | 02/01/2007 | 04/30/2007 | Complete | 3 | 3 | $123,000 | $141,000 |

BIDCHAIN

| HOME | SERVICES | ABOUT US | CONTACT US |

Welcome, Mike Walker
(contraction Manager)

Home > New Project

Construction Manager New Project
Please fill in the information below and click the 'Submit' button at the bottom to create your new project. Red asterisks denote required fields.

Project Description: [_____] *

Project Location: [_____] *

Bid Date: [____] *

Due Date: [____] *

Project Start Date: [____] *

Completion Date: [____] *

Contract Type:
○ Lump Sum
○ Cost + Fee
○ Cost + Fee Guaranteed Max

Tax Exempt: ○ Yes ○ No

Labor Type:
☐ Union Labor Only
☐ General Contractor's Discretion

Final Clean:
○ Management
○ Contractor

Final Walkthrough:
○ Scheduled
○ By Appointment Only

Site Area (Sq.Ft.): [____] *

Bid Bond Required: ○ Yes ○ No

If Bid Bond Req'd: [__] %

Performance Bond: ○ Yes ○ No

Material & Payment Bond: ○ Yes ○ No

Insurance Certificate Holder: [_____]

Additional Insured: [_____]

Project Documents: [_____]

[UPLOAD DOCUMENT]

[SUBMIT] [CANCEL]

FIG. 7

BIDCHAIN

HOME | SERVICES | ABOUT US | CONTACT US

Welcome, Mike Walker
(Construction Manager)

Home > Project Review > Invite General Contractors

Invite A New General Contractor - SWC Tech Partners Project

Name: _____ *
Company: _____ *
Address 1: _____ *
Address 2: _____
City: _____ *
State: ___ *
Zip Code: _____ *
Phone: _____
Email: _____ *

[BACK] [CONTINUE]

BIDCHAIN

| HOME | SERVICES | ABOUT US | CONTACT US |

Welcome, Mike Walker
(Construction Manager)

Home > Project Review > Invite General Contractors

Send General Contractor Invitations - SWC Tech Partners Project

Below is a list of the General Contractors that you have selected to invite to bid on the project. Select the General Contractors that haven't yet been sent invitations, and click the 'Send Invitations' button below.

| Sel | Company | Name | City | State | E-Mail | Date Invited | Date Accepted |
|-----|---------|------|------|-------|--------|--------------|---------------|
| ☐ | SWC Technology Partners | Jeff Lanham | Oak Brook | IL | jeff.lanham@swc.com | 05/01/2007 | 05/15/2007 |
| ☐ | Leasecorp, Ltd. | Mike Walker | Oak Brook | IL | mike.walker@leasecorp.com | 05/01/2007 | |
| ☑ | Leasecorp, Ltd. | Nancy Holub | Oak Brook | IL | nancy.holub@leasecorp.com | | |

[BACK] [CONTINUE]

[INVITE SELECTED]
56

FIG. 8

BIDCHAIN

| HOME | SERVICES | ABOUT US | CONTACT US |

Welcome, Mike Walker(General Contractor)

Home > Project Review > General Contractor Home

General Contractor Home

As a General Contractor, you can use this screen to review project invitations from Construction Managers, and manage the bidding process on existing projects.

Project Invitations
Below is a list of project invitations. Click the project description link to begin the bid process.

| Construction Manager | Description | Start Date | Finish Date |
|---|---|---|---|
| Mike Walker | SWC Technology Partners | 05/01/2007 | 07/31/2007 |
| Mike Walker | Leasecorp, Ltd. | 04/01/2007 | 06/30/2007 |
| Mary Jones | XYZ Incorporated | 02/01/2007 | 04/30/2007 |

— 66

Existing Projects
Below is a list of your existing projects. Click the project description link to view the details of each project.
Show: ○ Active  ○ Inactive  ○ All

| Description | Start Date | Finish Date | Status | # SCs Invited | # SCs Responded |
|---|---|---|---|---|---|
| SWC Technology Partners | 05/01/2007 | 07/31/2007 | Open | 3 | 1 |
| Leasecorp, Ltd. | 04/01/2007 | 06/30/2007 | Open | 0 | 0 |
| XYZ Incorporated | 02/01/2007 | 04/30/2007 | Complete | 3 | 3 |

BIDCHAIN

| HOME | SERVICES | ABOUT US | CONTACT US |

Welcome, Mike Walker
(Construction Manager)

Home > New Project

GENERAL CONTRACTOR PROJECT INFORMATION PAGE
Below is the information relating to the subject project SWC TECH PARTNERS Project Description: Interior office build out Project Location: 1900 Higgins, Rosemont, IL Bid Date: 06/15/07 *  Bid Bond Required: ○ Yes ⦿ No Due Date: 07/01/07 *  If Bid Bond Req'd: [    ] %

Project Start Date: 07/15/07 *  Performance Bond: ⦿ Yes ○ No

Completion Date: 09/01/07 *  Material & Payment Bond: ⦿ Yes ○ No

Contract Type:
⦿ Lump Sum
○ Cost + Fee
○ Cost + Fee Guaranteed Max

Insurance Certificate Holder: Prudential

Tax Exempt: ⦿ Yes ○ No
Labor Type: ☒ Union Labor Only
☐ General Contractor's Discretion Additional Insured: Marc Realty
2899 Lambert Road
Rosemont, IL 60019

Final Clean:
○ Management
⦿ Contractor

Project Documents: workingdrawings.dwg
building rules.doc
map of location.pdf

Final Walkthrough:
○ Scheduled
⦿ By Appointment Only

[DOWNLOAD DOCUMENT] — 72

Site Area (Sq.Ft.): 28,550 RSF

[BACK] [CONTINUE] — 74

FIG. 13

BIDCHAIN

| HOME | SERVICES | ABOUT US | CONTACT US |

Welcome, Mike Walker
(General Contractor)

Home > GC New Project > GC Divisions & Categories

General Contractor Project Divisions & Categories - SWC Tech Partners Project Please select the work divisions & categories for the project by clicking each item in the 'Divisions' list, and checking the applicable items in the 'Categories' list that are needed for the project. Click 'Next' to proceed to Subcontractor Invitations.

| Division | # Cats |
|---|---|
| Demolition | 3 |
| Concrete | 0 |
| Masonry | 3 |
| Steel | 2 |
| Carpentry | 4 |
| Roofing | 0 |
| Doors, Frames & Hardware | 6 |
| Finishes (Wall & Floor) | 3 |
| Specialties | 2 |
| Sprinklers | 4 |
| HVAC | 5 |
| Electric | 7 |
| Fire Alarm | 2 |
| Voice & Data | 3 |

74

Categories for Division: Masonry

| | |
|---|---|
| ☐ Maintenance of Masonry | ☐ Commissioning of Masonry |
| ☐ Clay Unit Masonry | ☑ Adobe Unit Masonry |
| ☐ Concrete Form Masonry Units | ☐ Dry-Placed Stone |
| ☐ Refractory Masonry | ☑ Castable Refractory Masonry |
| ☐ Corrosion-Resistant Masonry | ☐ Manufactured Masonry |
| ☐ Common Work Results for Masonry | ☐ Unassigned |
| ☑ Concrete Unit Masonry | ☐ Unit Masonry Panels |
| ☐ Unassigned | ☐ Exterior Stone Cladding |
| ☐ Flue Liner Masonry | ☐ Refractory Brick Masonry |
| ☐ Chemical-Resistant Brick Masonry | ☐ Manufactured Brick Masonry |

76

78

[BACK] [NEXT] [CANCEL]

| BIDCHAIN | HOME | SERVICES | ABOUT US | CONTACT US |
|---|---|---|---|---|
| | | | Welcome, Mike Walker (General Contractor) | |

Home > GC New Project > GC Divisions & Categories > GC Invite Subcontractors

General Contractor Invite Subcontractors - SWC Tech Partners Project

Please click to select a work division, then either select from most recently user subcontenter search criteria in the fields below and click the 'Search button to find matches, or click the 'New' button to invite a new subcontractor.

| Division | # SCs |
|---|---|
| Demolition | 3 |
| Concrete | 0 |
| Masonry | 3 |
| Steel | 2 |
| Carpentry | 4 |
| Roofing | 0 |
| Doors, Frames & Hardware | 6 |
| Finishes (Wall & Floor) | 3 |
| Specialties | 2 |
| Sprinklers | 4 |
| HVAC | 5 |
| Electric | 7 |
| Fire Alarm | 2 |
| Voice & Data | 3 |

84

Most Recently Used Subcontractors

| Sel | Company | Name | City | State | E-Mail |
|---|---|---|---|---|---|
| ☑ | SWC Technology Partners | Jeff Lanham | Oak Brook | IL | jeff.lanham@swc.com |
| ☐ | Leasecorp, Ltd. | Mike Walker | Oak Brook | IL | mike.walker@leasecorp.com |

86

[INVITE SELECTED]

Search for Subcontractors

City: [    ]  State: [    ]  Company: [    ]  [SEARCH]

3 Subcontractors Found

| Sel | Company | Name | City | State | E-Mail |
|---|---|---|---|---|---|
| ☑ | SWC Technology Partners | Jeff Lanham | Oak Brook | IL | jeff.lanham@swc.com |
| ☐ | Leasecorp, Ltd. | Mike Walker | Oak Brook | IL | mike.walker@leasecorp.com |

88

[INVITE SELECTED]

Currently Selected Invitees

| Sel | Company | Name | City | State | E-Mail |
|---|---|---|---|---|---|
| ☑ | SWC Technology Partners | Jeff Lanham | Oak Brook | IL | jeff.lanham@swc.com |
| ☐ | Leasecorp, Ltd. | Mike Walker | Oak Brook | IL | mike.walker@leasecorp.com |

90

[INVITE NEW] [REMOVE SELECTED]

92

[BACK] [CONTINUE] [CANCEL]

FIG. 15

BIDCHAIN

| HOME | SERVICES | ABOUT US | CONTACT US |

Welcome, Mike Walker
(Construction Manager)

Home > Project Review > Invite General Contractors

Invite A New Subcontractor - SWC Tech Partners Project

Division: Masonry
Name: _____ *
Company: _____ *
Address 1: _____ *
Address 2: _____
City: _____ *
State : __ *
Zip Code: ___ *
Phone: _____
Email: _____ *

[BACK] [CONTINUE]

BIDCHAIN

| HOME | SERVICES | ABOUT US | CONTACT US |

Welcome, Mike Walker(General Contractor)

Home > GC New Project > GC Divisions & Categories > GC Invite Subcontractors

General Contractor Send Subcontractor Invitations - SWC Tech Partners Project Below is a list of the Subcontractors, for the selected Division, that you have selected to invite to bid on the project. Select the Subcontractors that haven't yet been sent invitations, and click the "Send Invitations" button below.

| Division | # SCs | | Sel | Company | Name | City | State | E-Mail | Date Invited | Date Accepted |
|---|---|---|---|---|---|---|---|---|---|---|
| Demolition | 3 | | ☑ | SWC Technology Partners | Jeff Lanham | Oak Brook | IL | jeff.lanham@swc.com | 05/01/2007 | 05/15/2007 |
| Concrete | 0 | | ☐ | Leasecorp, Ltd. | Mike walker | Oak Brook | IL | mike.walker@leasecorp.com | 05/01/2007 | 05/15/2007 |
| Masonry | 3 | | | | | | | | | |
| Steel | 2 | | | | | | | | | |
| Carpentry | 4 | | | | | | | | | |
| Roofing | 0 | | | | | | | | | |
| Doors, Frames & Hardware | 6 | | | | | | | | | |
| Finishes (Wall & Floor) | 3 | | | | | | | | | |
| Specialties | 2 | | | | | | | | | |
| Sprinklers | 4 | | | | | | | | | |
| HVAC | 5 | | | | | | | | | |
| Electric | 7 | | | | | | | | | |
| Fire Alarm | 2 | | | | | | | | | |
| Voice & Data | 3 | | | | | | | | | |

[SEND INVITATIONS ABOVE] — 98

94

[SEND ALL SUBCONTRACTOR INVITATIONS] — 100

[BACK] [CONTINUE] [CANCEL]

BIDCHAIN

Home > Project > Bid Review

| HOME | SERVICES | ABOUT US | CONTACT US |

Welcome, Mike Walker
(Subcontractor)

Subcontractor Bid Review Summary - SWC Tech Partners Project

Below is a summary of the bid to present to the General Contractor. Please fill in the additional information required. Click Submit to save and exit, click Publish to send final bid to the General Contractor.

| Division | SC Amount |
|---|---|
| Concrete | $9,250 |
| Masonry | $4,330 |
| Specialties | $57,580 |

| Project Sub-Total | $72,160 |
|---|---|

Additional Costs

| Permits | % |
| Bonds | $ |
| General Conditions | $ |
| Overhead & Fee | % |
| Final Clean | $ |
| Adjustments | $ |

| Project Grand Total | $72,160 |
|---|---|

[SAVE] [CANCEL] [VIEW]

[PUBLISH]

BIDCHAIN

| HOME | SERVICES | ABOUT US | CONTACT US |

Welcome, Mike Walker
(Subcontractor)

Home > Project > Bid Review

Subcontractor Bid Review - SWC Tech Partners Project

Below is a listing of the current bids from Subcontractors you have invited to this project. To view more details of the bid, click View. To select the Subcontractor for this project, click Select.

| Division | # Cats | Categories | ABC Masonry, Inc. | XYZ & Co. Masonry | Masonry, Ltd. |
|---|---|---|---|---|---|
| Demolition | 38 | Maintenance of Masonry | $28,000 | | |
| Concrete | 17 | Clay Unit Masonry | $57,000 | | $55,000 |
| Masonry | 18 | Concrete Form Masonry Units | | | |
| | | Refractory Masonry | | | |
| Steel | 12 | Corrosion-Resistant Masonry | $3,000 | | |
| | | Common Results for Masonry | | | $1,300 |
| Carpentry | 8 | Concrete Unit Masonry | $66,000 | $62,250 | $58,750 |
| | | Unassigned | | | $21,000 |
| Roofing | 20 | Flue Liner Masonry | | $13,000 | $12,000 |
| Doors, Frames & Hardware | 16 | Chemical-Resist Brick Masonry | | | |
| Finishes (Wall & Floor) | 21 | Commissioning of Masonry | $42,750 | | |
| Specialties | 32 | Adobe Unit Masonry | $68,900 | $8,000 | |
| Sprinklers | 10 | Dry-Placed Stone | | | |
| | | Castable Refractory Masonry | | | |
| | | Manufactured Masonry | | | |
| HVAC | 14 | Exterior Stone Cladding | $250 | $500 | $300 |
| Electric | 14 | Grand Total | $102,000 | $70,750 | $150,000 |
| Fire Alarm | 23 | | VIEW  SELECT | VIEW  SELECT | VIEW  SELECT |
| Voice & Data | 9 | | | | |

CONTINUE

140 / 142

BIDCHAIN

Home > Project > Bid Review

HOME | SERVICES | ABOUT US | CONTACT US

Welcome, Mike Walker (General Contractor)

General Contractor Bid Review - SWC Tech Partners Project

Below is a summary of the bid to present to the Construction Manager. Please fill in the additional information required. Click Submit to save and exit, click Publish to send final bid to the Construction Manager.

| Division | SC Amount | | Project Sub-Total | $104,000 |
|---|---|---|---|---|
| Demolition | $22,000 | | | |
| Concrete | $9,250 | | Additional Costs | |
| Masonry | $4,330 | | Permits | % |
| Steel | $12,000 | | Bonds | $ |
| Carpentry | $45,780 | | General Conditions | $ |
| Roofing | $11,250 | | Overhead & Fee | % |
| Doors, Frames & Hardware | $5,760 | | Final Clean | $ |
| Finishes (Wall & Floor) | $34,000 | | Adjustments | $ |
| Specialties | $57,580 | | | |
| Sprinklers | $18,999 | | Project Grand Total | |
| HVAC | $750 | | | |
| Electric | $21,950 | | | |
| Fire Alarm | $4,650 | | | |
| Voice & Data | $3,000 | | | |

148

SAVE   PUBLISH   CANCEL
152
VIEW

FIG. 21

CONSTRUCTION BIDDING SYSTEM AND METHOD

CLAIM OF PRIORITY

This Application claims priority form U.S. Provisional Patent Application Ser. No. 60/856,225 filed Nov. 1, 2006.

FIELD OF THE INVENTION

The invention relates generally to the construction industry and, more particularly, to a system and method that facilitates and standardizes the bidding process for construction projects.

BACKGROUND

As important as it is to control construction costs in the multi-trillion dollar commercial real estate industry, there is a decided lack of thoroughness and consistency in the contractor bidding process by both general contractors and subcontractors of specific trades. More specifically, general contractors and subcontractors typically do not use the same bid structures, software programs or subcontractor categorization, making it very difficult for tenants, landlords or construction managers to compare (and subsequently negotiate) bids side-by-side and very easy to overlook inconsistencies from bid to bid. Both lack of thoroughness and bid format consistency lead to misjudgments, wasted time and wasted money by the parties involved in a construction project.

When a commercial real estate tenant leases office space, a landlord typically will offer a construction allowance for the tenant to build out their space, since most tenants will design and use their space in very different ways. Once an office lease is signed, there is often a pre-move-in period where the tenant will perform construction alterations to either build out their space from scratch (in the case of a tenant build-out in a space that has never been occupied before) or retrofit existing conditions for the tenant's use. In either case, the job is typically performed by a general contractor who manages the project by scheduling and using various subcontractors to perform the work to be done. The general contractor typically charges a fee for this service.

In return for the fee that the general contractor charges the tenant or landlord (or other party) and in addition to scheduling and arranging to have the work performed for the tenant or landlord, it is the general contractor's job to attempt to have the necessary work done at the most favorable rates (although it should be noted that general contractors do not always simply take the lowest bidder). As such, the general contractor will typically bid out the work to be done to several subcontractors in each trade (generally two to four subcontractors depending on the trade) to secure the most favorable terms for the tenant or landlord. On a typical full scale office build-out, there are typically ten to twelve trades involved. There may be even more trades involved on jobs that are outside a typical office build-out (erecting buildings, highways and plants, for example).

Because the tenant or landlord is also in search of the most favorable rates to complete the job at hand, and because the fees and overhead that general contractors charge can vary depending on contractor, it is common for the tenant or landlord to want to solicit bids from more than one general contractor. In most cases, the tenant or landlord will want to solicit bids from three to four subcontractors, but on certain large projects, or projects that involve public bidding, there can be many more. The tenant or landlord may elect to handle the task of managing the general contractor bidding and selection process or hire a construction manager to handle that task.

The job of the construction manager involves more than just sending out a bid and picking the lowest bidder. In addition to overseeing the job, addressing issues that might arise during the job, processing invoices for payment to the general contractor and conducting the final walk through to ensure that the job was completed as contracted, the construction manager must also review contractor bids and award the bid to the desired general contractor. To perform this part of their work, the construction manager will typically examine the bids submitted by the general contractors that were invited to bid. This examination serves many purposes. First and foremost, the general contractor must make sure that the contractors' bids are being evaluated on an apples-to-apples basis. For example, one general contractor may have exclusions (that will cost the tenant or landlord money) that another general contractor doesn't, thus effectively increasing that contractor's bid amount. For example, the contractor may exclude any Saturday work which may be required for the particular project. Additionally, some items may require the general contractors to provide an allowance for certain items that are either not known or can not be estimated at the current time. Examples of these may be an allowance for appliances that have not been specified yet or an allowance for permits that will not be known until the general contractor subunits the drawings for permit. The construction manager would want to make sure that the allowances were similar between the general contractors and if not, make the appropriate adjustments to put them all on an equal playing level.

The construction manager may also review line items on the general contractors' bids to site any glaring discrepancies or obvious oversights. Although this would again serve to ensure that the contractors are bidding on an-apples-to-apples basis, it would also serve to provide a less time intensive completion to the job because identifying oversights and misinterpretations before the contract is awarded can prevent arguments and disputes once the job is active.

However, the current process of reviewing the bid documents for discrepancies, adjustments in allowances, identification of varying exclusions is not a simple task. The reason for this is lack of a consistent method and system not only from general contractor to general contractor, but from subcontractor to subcontractor. Considering that general contractors typically solicit bids from an average of three subcontractors in each of twelve different trade categories, and that the construction manager would typically solicit bids from at least three different general contractors, an average job may include subcontractor bids from over one hundred possible companies. Additionally, the general contracting industry has no standard format when presenting their line item bid to the construction manager or user. This means that the format of general contractor bids vary from contractor to contractor, complicating the already difficult process. In addition to most likely presenting the bids from the different trades in different orders, different general contractors may include specific work in different trade categories (for example, one general contractor may have a separate line item for demolition while another would include it in general conditions).

In addition, the documentation from subcontractors to the general contractor(s) is not only inconsistent from subcontractor to subcontractor, but in most cases not detailed. Although some subcontractors may submit their bid to the general contractor in formats that are very detailed (usually generated from one of many construction cost estimating programs available on the market) others may simply fax a one line total, while others may send an email or simply give a verbal quote. This array of potential formats from subcontractors makes it very difficult for the construction manager to ensure that all items of the job have been bid on accurately. While leaving out items that a subcontractor might have missed can certainly lead to disputes once the project has begun, over bidding on work that doesn't need to be done will alternatively have the negative effect of adding cost to the project.

At the end of the day, the construction manager is often left to the task of deciphering bids from three (or more) different general contractors who all present their information in different formats (using different software) and who each solicit bids from dozens of subcontractors, with none of the subcontractors using the same software and all with varying degrees of detail. As a result, before a bid is awarded by the construction manager, hours of work are typically spent double-checking bids, confirming inclusions and exclusions by all contractors, recalculating bid amounts and adjusting to put all contractors on an apples-to-apples basis.

A need therefore exists for a multi-tiered web-based software system that allows a construction manager to dictate the format and level of detail that will be presented for not only the general contractors supplying bids, but all of the subcontractors of those general contractors as well.

BRIEF DESCRIPTION OF THE DRAWINGS

FIGS. 3-22 are screen prints of displays provided by the system of FIG. 1 and in accordance with the method of FIGS. 2A-2B.

DETAILED DESCRIPTION OF EMBODIMENTS

Although the present invention can be used in virtually any construction bidding situation where there is a need for subcontractors, general contractors and an owner, landlord, tenant, construction manager or some other overseeing party or manager (i.e. three tiers of bidding), it will be described below in terms of use for construction projects in the commercial real estate industry. The system and method of the present invention, however, could easily be converted into use in any other industry where there is a need for accurate, consistent and detailed construction bids.

Figure 1:
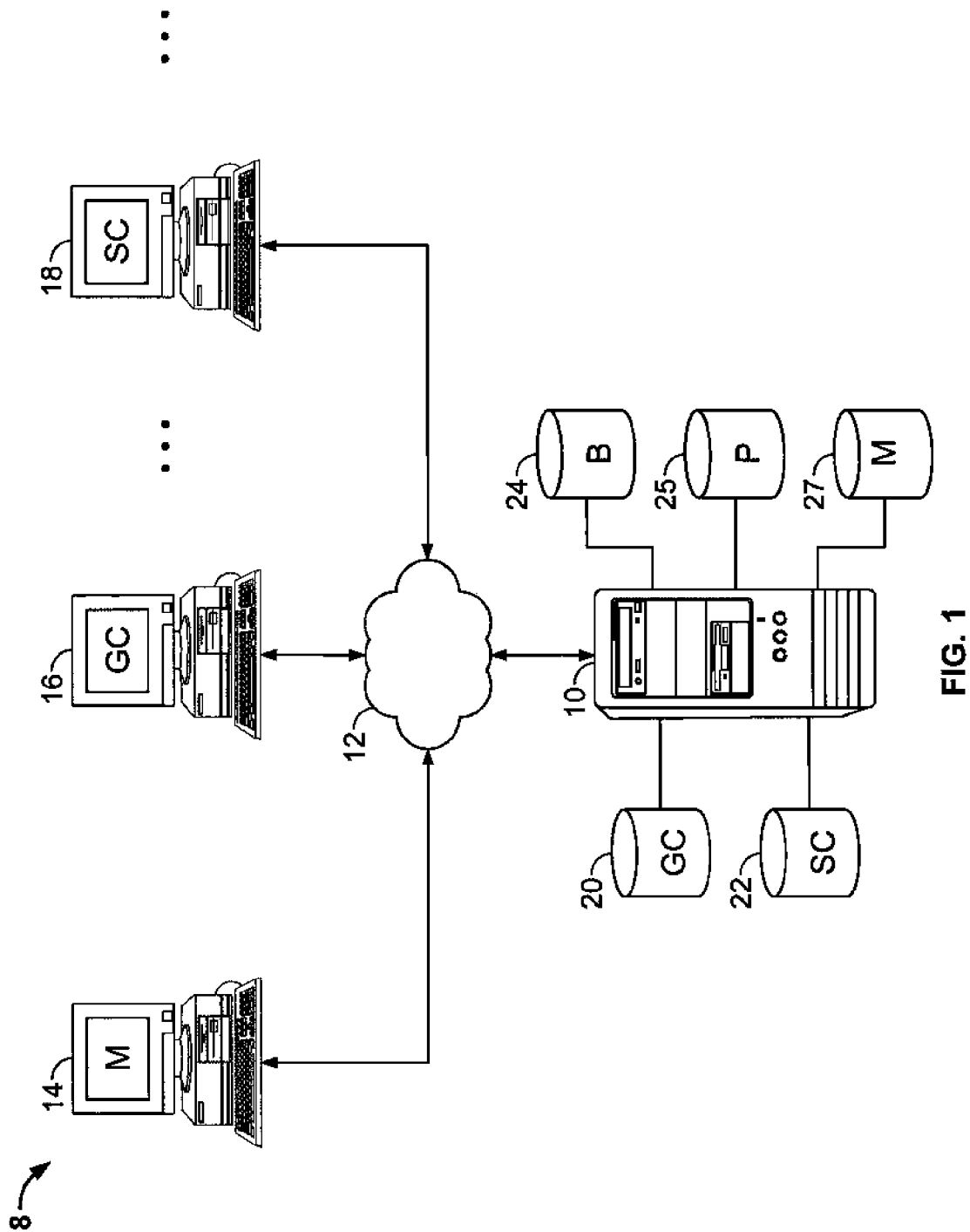
FIG. 1 is a schematic illustrating an embodiment of the system of the present invention.

An embodiment of the system of the present invention is indicated in general at 8 in FIG. 1. The system includes a server 10 which hosts a website and associated software with the functionality as described below. A number of workstations communicate with the server 10 via a network such as the Internet 12. The workstations may include a workstation for a landlord, tenant or construction manager, hereinafter referred to generally as a manager workstation 14, general contractor workstations 16 and subcontractor workstations 18. The server also communicates with or hosts a general contractor database 20, a subcontractor database 22, a bid database 24, a project database 25 and a materials database 27.

Figure 2A:
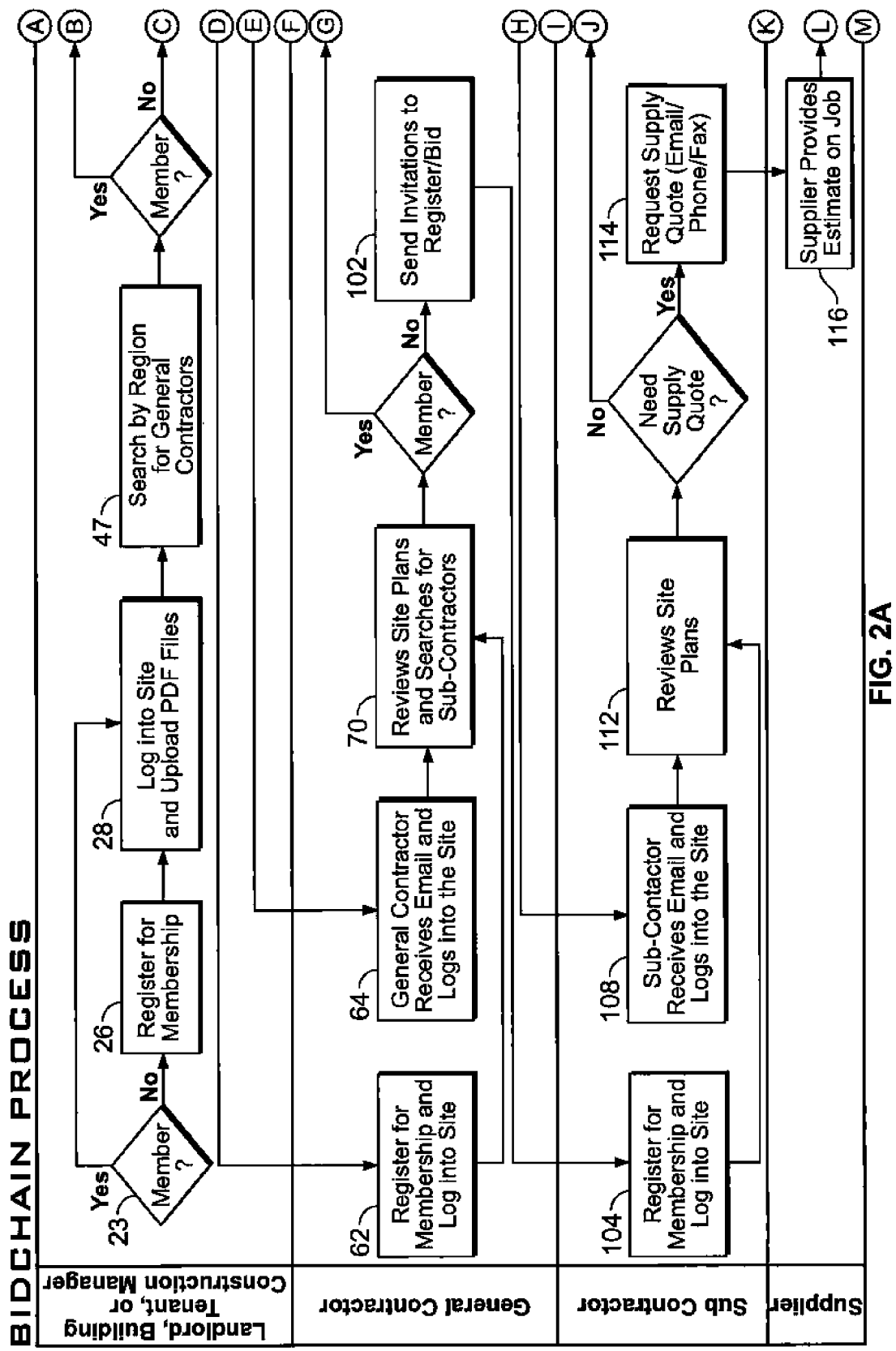
FIGS. 2A-2B are a flow chart illustrating an embodiment of the method of the present invention that may be performed using the system of FIG. 1.
Figure 2B:
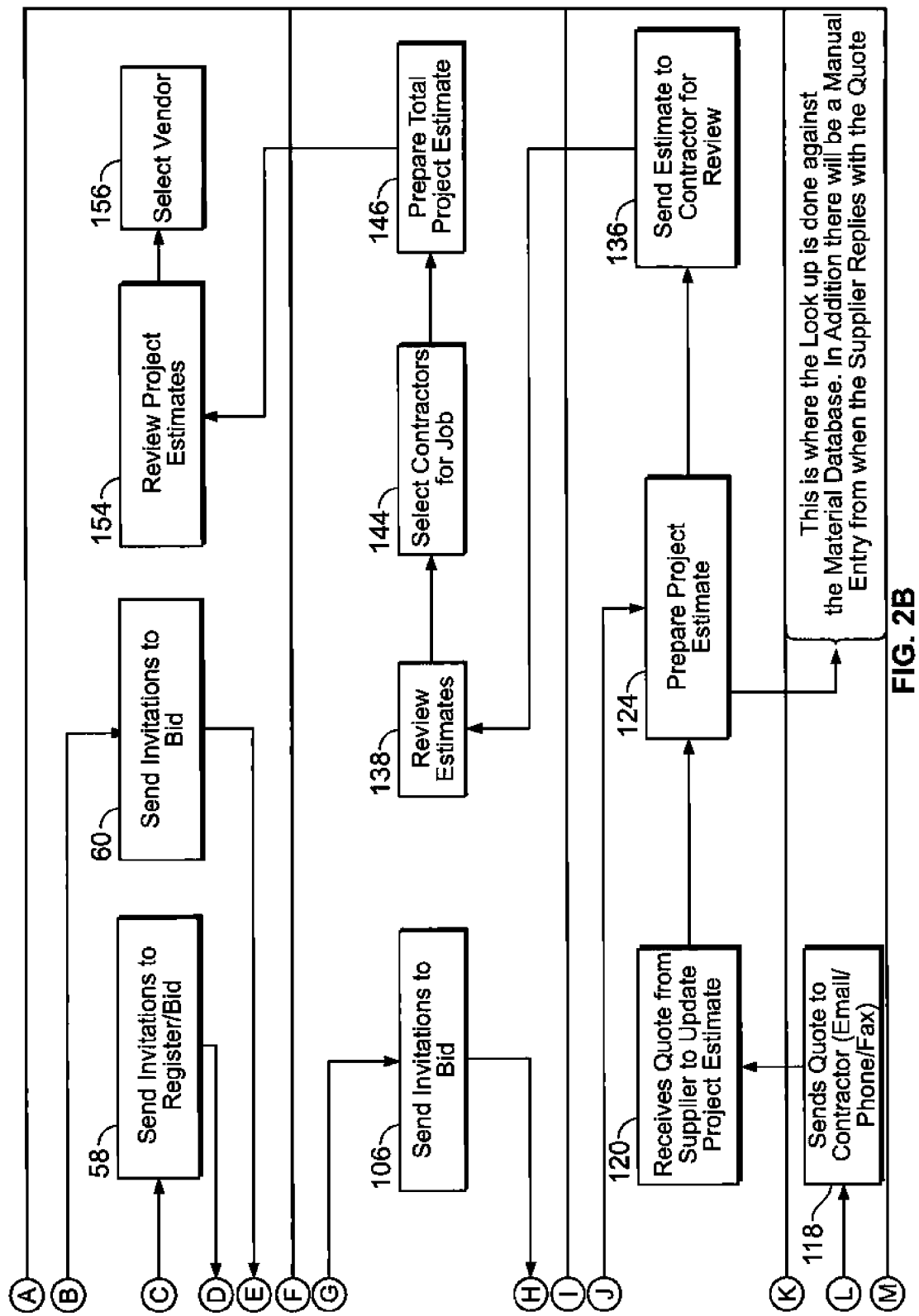
Figure 3:
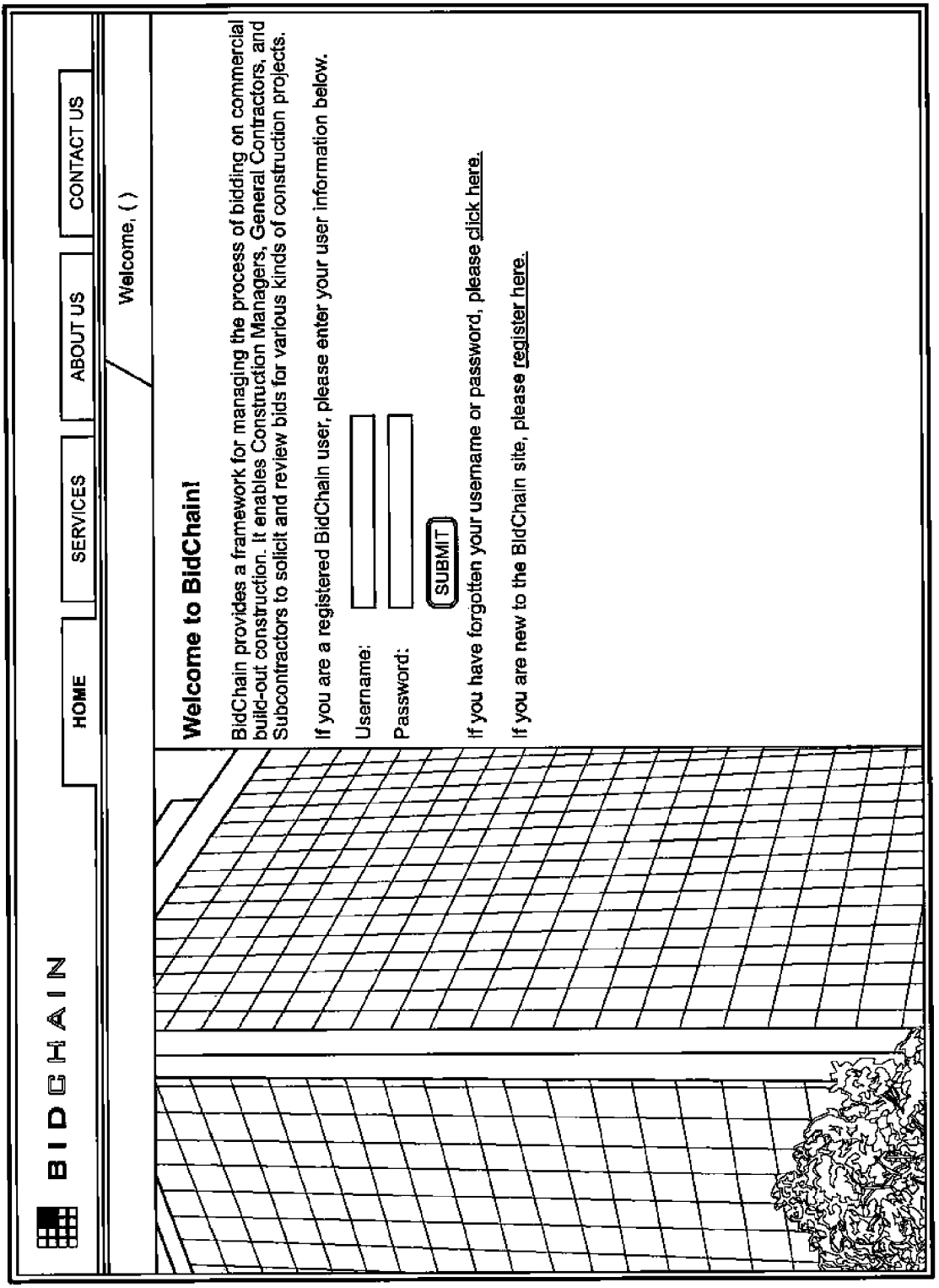

The process flow in an embodiment of the system and method of the present invention is illustrated in FIGS. 2A-2B. As illustrated in FIGS. 2A-2B at 23, when a manager first logs onto the website hosted by the server 10 of FIG. 1, a prompt for his or her user name and password is provided. This occurs via the screen of FIG. 3, which is displayed on the manager's workstation 14 of FIG. 1. If the manager is not a registered member of the website, he or she may register, as indicated at block 26 in FIGS. 2A-2B.

If the manager is a registered member of the website, and has successfully entered his or her username and password, they are successfully logged onto the website, as indicated by block 28 of FIGS. 2A-2B, and the screen of FIG. 4 is displayed. This is the manager's Construction Manager Home Page and the manager's current projects, as stored on the project database 25 of FIG. 1, are listed in table 32 of FIG. 4. More specifically, the table lists the manager's projects for which bids are still being sought, as indicated by an "Open" indication in Status column 34, as well as projects for which the bidding process has been completed, as indicated by a "Closed" indication in Status column 34. As indicated by FIG. 4, in addition to listing the project name and status for each project, the table 32 lists the start and finish dates of the bidding period, the number general contractors invited to bid, the number of general contractors who have responded and the low and high bids. The manager may view the bid information for each project, which is stored on the bid database 24 of FIG. 1, by clicking on or otherwise selecting the project name.

If the manager wishes to create a new project, icon 36 of FIG. 4 is selected. This results in the New Project screen of FIG. 5 being displayed. The manager enters the necessary information for a project into the fields of the screen of FIG. 5, using the workstation 14 of FIG. 1, and, as indicated by block 28 of FIGS. 2A-2B, uploads any .pdf files which may include project plans, specifications and other project-related documents. Of course, file formats other than .pdf may be used and the amount and type of information provided may vary from project to project.

Figure 6:

Once the project information is entered via the screen of FIG. 5, the General Contractor Selection screen of FIG. 6 is displayed to the manager. In addition to listing the most recently used general contractors in table 38, the manager may search for general contractors by region or specific contractor company name using the City, State and Company fields 42, 44 and 46 of FIG. 6, as indicated by block 47 of FIGS. 2A-2B. With reference to FIG. 1, the software of server 10 uses the entered information and searches the general contractor information stored on general contractor database 20 of FIG. 1. The results are displayed in table 48 of FIG. 6. The manager may select general contractors that he or she would like to send invitations to bid to by scrolling through table 48, and the selected general contractors are displayed on table 52.

If the manager would like to invite a general contractor to bid who is not currently on the general contractor database 20 of FIG. 1, the Invite New icon 54 of FIG. 6 is selected. This results in the New General Contractor screen of FIG. 7 being displayed. Contact information for the new general contractor is entered into the screen and uploaded into the general contractor database 20 of FIG. 1.

Once the general contractors are selected, they are displayed on the Send General Contractor Invitations screen of FIG. 8. The manager may then select the appropriate general contractors and select the Invite Selected icon 56 of FIG. 8. With reference to FIG. 1, the software of server 10 of FIG. 1 then sends invitations via e-mail over network 12 to the general contractor workstations 16 of the selected general contractors.

Figure 9:
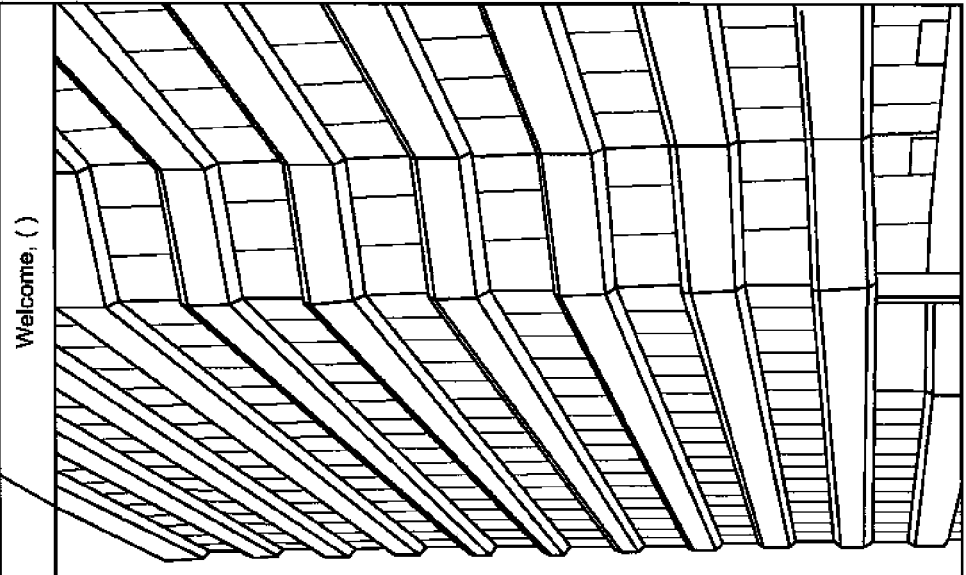

Each general contractor selected by the manager receives an e-mail, via a general contractor workstation 16 of FIG. 1, notifying it of the manager's request for proposal and including a link to the website hosted by server 10. If the general contractor is not a registered member of the website, it is sent an invitation to register, as indicated by block 58 of FIGS. 2A-2B. The general contractor may use the screen of FIG. 9 to register, as indicated at block 62 of FIG. 2. This is the same screen that is presented to a manager in block 26 of FIGS. 2A-2B when he or she needs to register. The screen of FIG. 9 will only permit one role to be selected: Construction Manager, General Contractor or Subcontractor. If the general contractor is already a member of the website, it is only sent a request for proposal/invitation to bid, as indicated by block 60 of FIGS. 2A-2B. As illustrated by block 64 of FIGS. 2A-2B, the general contractor may then simply log onto the site via a screen such as the one illustrated in FIG. 3.

Once the general contractor successfully logs in, or successfully registers and logs in, the General Contractor Home Page screen of FIG. 10 is displayed via the general contractor workstation 16 of FIG. 1. The screen of FIG. 10 features a Project Invitation table 66 and an Existing Projects table 68. If the general contractor wishes to review the request for proposal, it clicks on the project description provided in table 66. The software of the server 10 of FIG. 1 then retrieves the project details from the project database 25 of FIG. 1 and displays them via the screen of FIG. 11. This screen also provides the general contractor with the opportunity to download and review the project plans, specification and other .pdf documents, as indicated at block 70 of FIGS. 2A-2B. The documents may be downloaded when the general contractor selects the Download Document icon 72 of the screen of FIG. 11.

Figure 12:

If the general contractor wishes to accept the invitation to bid, it selects the Continue icon 74 of FIG. 11 and the General Contractor New Project screen of FIG. 12 is displayed on the general contractor workstation. After the initial information presented in the screen of FIG. 12 is entered, the General Contractor Project Divisions and Categories screen of FIG. 13 is presented to the general contractor. The primary purpose of this screen is to help the general contractor identify the trade divisions and categories required by the project. The screen of FIG. 13 features a Division table 74. When the general contractor clicks or otherwise selects a Division of table 74 of FIG. 13, the corresponding row of the table becomes highlighted and a corresponding Categories table is displayed. Table 76 of FIG. 13 illustrates, for example, the categories of the Masonry division, which is highlighted in table 74. The general contractor selects the categories of table 76 that are applicable to the project, and the number of categories selected is tallied in column 78 of table 74. Although the software may use categories consistent with the Construction Specification Instituted (CSI) code classification system, such as MasterFormat, it will be apparent to those skilled in the art that the software will not be affected if another system of categorizing trades and specific contractor work is used.

Once the trade divisions and categories have been selected by the general contractor using the screen of FIG. 13, the general contractor selects the Next icon 82 and the Subcontractor Selection screen of FIG. 14 is displayed. The general contractor uses this screen to select the subcontractors from which it wishes to receive bids for the project, as indicated in block 70 of FIGS. 2A-2B.

Similar to the screen of FIG. 13, the screen of FIG. 14 features a Division table 84. As each division of table 84 is clicked on or otherwise selected, the corresponding row in the table is highlighted and corresponding tables 86, 88 and 90 are displayed. Table 86 lists the most recently used subcontractors for the highlighted division in table 84 (Masonry in FIG. 14). The general contractor may search for subcontractors for the highlighted division by region or specific contractor company name using the City, State and Company fields 92, 94 and 96 of FIG. 14. With reference to FIG. 1, the software of server 10 uses the entered information and searches the subcontractor information stored on subcontractor database 22 of FIG. 1. The results are displayed in table 88 of FIG. 14. The general contractor may select the subcontractors that he or she would like to send invitations to bid to by scrolling through table 88, and the selected subcontractors are displayed on table 90. This process is repeated for all of the divisions of table 84.

If, for a particular division of table 84, the general contractor would like to invite a subcontractor to bid who is not currently on the subcontractor database 22 of FIG. 1, the Invite New icon 92 of FIG. 6 is selected. This results in the New Subcontractor screen of FIG. 15 being displayed. Contact information for the new subcontractor is entered into the screen and uploaded into the subcontractor database 22 of FIG. 1.

Each subcontractor selected by the manager receives an e-mail, via a subcontractor workstation 18 of FIG. 1, notifying it of the manager's request for proposal and including a link to the website. If the subcontractor is not a registered member of the website, it is sent an invitation to register and bid, as indicated by block 102 of FIGS. 2A-2B. The subcontractor may use the screen of FIG. 9 to register, as indicated at block 104 of FIGS. 2A-2B. If the subcontractor is already a member of the website, it is only sent a invitation to bid/request for proposal, as indicated by block 106 of FIGS. 2A-2B. As illustrated by block 108 of FIGS. 2A-2B, the subcontractor may then simply log onto the site via a screen such as the one illustrated in FIG. 3.

Each subcontractor selected by the manager receives an e-mail, via a subcontractor workstation 18 of FIG. 1, notifying it of the manager's request for proposal and including a link to the website. If the subcontractor is not a registered member of the website, it is sent an invitation to register and bid, as indicated by block 102 of FIG. 2. The subcontractor may use the screen of FIG. 9 to register, as indicated at block 104 of FIG. 2. If the subcontractor is already a member of the website, it is only sent a invitation to bid/request for proposal, as indicated by block 106 of FIG. 2. As illustrated by block 108 of FIG. 2, the subcontractor may then simply log onto the site via a screen such as the one illustrated in FIG. 3.

Figure 17:

Once logged in, or registered and logged in, a screen such as the screen of FIG. 17 is presented to a subcontractor. After reviewing the categories listed in table 110 of the screen of FIG. 17, the subcontractor may proceed to the screen of FIG. 11, which are the same project details reviewed by the general contractor. As such, the subcontractor may also download the project plans, specifications and other documents from the project database 25 of FIG. 1 by selecting icon 72 of the screen of FIG. 11. After reviewing the project information, as indicated by block 112 of FIGS. 2A-2B, the subcontractor may require a price quotation from one or more suppliers. Such quotes may be requested by telephone or fax, as indicated by block 114 in FIGS. 2A-2B, to which the supplier provides a response, as indicated by blocks 116 and 118 of FIGS. 2A-2B. The subcontractor may then incorporate the quote into its bid, as indicated by block 120 of FIGS. 2A-2B.

As indicated by block 124 of FIGS. 2A-2B, the subcontractor next prepares its bid to submit to the general contractor. This may be accomplished by the Subcontractor Project Estimate screen of FIG. 18. This screen includes a table 126 with a breakdown of the divisions and categories selected for the subcontractor in table 110 of FIG. 17. The software will not allow a subcontractor to bid on any items in categories it has not been invited to bid on. When a selection of table 126 is clicked on or otherwise selected, it becomes highlighted, as is the case for the category Maintenance of Concrete in FIG. 18, and a corresponding Detail table 128 appears.

The software preferably is able to dictate the amount of detail required on any give item within any given trade. For example, the software may only allow an extended price to be entered by entering a quantity and a unit price. This feature provides future reporting capabilities for the manager, allowing him or her to not only compare overall prices by subcontractors, but quantities and unit pricing as well. This feature also permits the construction manager to easily detect whether there are inconsistencies between any general contractors or subcontractors.

Figure 18:

The required material items for the highlighted category are listed in table 128 of the Subcontractor Project Estimate screen of FIG. 18, while Quantity, Price and Total fields are also provided in the table for each item. The required material items for each category are retrieved by the software of the server 10 of FIG. 1 from the materials database 27. The subcontractor may use the estimates provided by suppliers to complete the Price fields for each material item. Additional details regarding the bid may also be entered by the subcontractor via the Exclusions & Clarification table 130 and the Notes & Explanations table 132.

The software of the server 10 of FIG. 1 calculates the subcontractor's bid as it enters data into the screen of FIG. 18. When the data entry is completed for all of the divisions and categories of the table 126 of the screen of FIG. 18, the subcontractor selects the Save icon 134 of FIG. 18 and the Subcontractor Bid Review Summary screen of FIG. 19 is displayed. The bid data is saved on the bid database 24 of FIG. 1. The subcontractor may then print a summary report listing the bid details that they have entered and/or send an e-mail to the general contractor notifying it that the subcontractor's bid has been entered into the system and is ready for review, as indicated by block 136 of FIGS. 2A-2B. The software preferably provides each subcontractor with the option to upload their company logo so that it may be included on their proposal or bid.

The general contractor receives the notifications from the subcontractors that their bids have been entered via the general contractor workstation 16 of FIG. 1. After all of the subcontractor bids have been submitted, or as they are submitted, the general contractor may review them, as indicated by block 138 of FIGS. 2A-2B, via the Subcontractor Bid Review screen of FIG. 20. More specifically, each division for the project is listed in table 140 of FIG. 20. As illustrated in FIG. 20, the screen includes a comparison table 142 with columns listing bid details from each subcontractor. The general contractor may then select a subcontractor for each division of the project, as indicated by block 144 of FIGS. 2A-2B. As indicated by block 146 of FIGS. 2A-2B, the software of server 10 of FIG. 1 uses this information, along with the corresponding data from the bid database 24 and project database 25 of FIG. 1, to prepare the total project estimate from the subcontractor, which is presented via the screen of FIG. 21.

The general contractor will then be required to fill in any remaining portions of the bid for the manager via the fields of table 148 of the screen of FIG. 21. Examples of the remaining portions of the bid include, but are not limited to, the general contractor's charge for general conditions, profit, fee and overhead. It should again be noted that the software can dictate the format of how the general contractor enters each of these categories so that apples-to-apples general contractor comparisons can be made by the manager. The final bid data is saved to the bid database 24 of FIG. 1 when the Save icon 152 of the screen of FIG. 21 is selected.

The general contractor may then print a report listing the bid details and/or send an e-mail to the manager notifying it that the general contractor's bid has been entered into the system and is ready for review. Like the subcontractors, each general contractor preferably has the option to upload their company logo so that it may be included on their proposal.

Figure 22:

When the manager is notified that the bids for the project have been entered by the general contractors, the bid data, which is assembled using the bid database 24 of FIG. 1, is presented via the Construction Manager—General Contract Bid Review screen of FIG. 22. As indicated by block 154 of FIGS. 2A-2B, the manager may then review the bids offered by each general contractor and compare them against each other as the screen of FIG. 22 lists the bid details of each general contractor by column. As indicated by block 156 of FIGS. 2A-2B, the manager may then select the general contractor for the project, and the "winning" general contractor is notified. The general contractor then in turn notifies the appropriate subcontractors.

The system may optionally provide the manager with the ability to send rejection notifications to the general contractors not selected. Such capability may also be provided for the general contractors for subcontractors not selected. The system may optionally electronically deliver a contract to the general contractor to be executed and returned to the manager.

Therefore, the benefits of this embodiment of the system, because of its multi-tiered approach, include, but are not limited to: 1) enabling the manager to dictate the format of the proposals submitted by the general contractor, 2) allowing the construction manager to dictate the format of proposals from all subcontractors (by virtue of the fact that the subcontractors have to use the system because the general contractor must use the system), 3) allowing the manager to view any discrepancies in quantity or unit pricing of any subcontractor because the subcontractors must enter their information in predetermined fields, 4) allowing use of software by subcontractors and general contractors without purchase or download because it is a web based system, 5) allowing the manager to run detailed reports breaking down the bids by, among other things, trade, item, unit pricing, quantities, profit, general conditions, pricing trends and the like (all of which make it easier for the manager to quickly ensure that bids are accurate and competitive) and 6) allowing the manager, general contractor(s) and subcontractor(s) to quickly transfer project information, request for bids and acceptance or rejection notification(s) with much greater speed than the processes currently used in the industry.

The invention is therefore a system and method that not only standardizes how construction bids are delivered, but clarifies and expedites every step of the construction process—from the request for proposal and proposal format, to delivery of drawings, to standard contract terms and conditions.

While the preferred embodiments of the invention have been shown and described, it will be apparent to those skilled in the art that changes and modifications may be made therein without departing from the spirit of the invention, the scope of which is defined by the appended claims.

What is claimed is:

1. A construction bidding system comprising:
   a. a manager workstation;
   b. a general contractor workstation;
   c. a subcontractor workstation;

d. at least one database upon which is stored a listing of general contractors, a listing of subcontractors, a listing of trade divisions and a listing of categories for each trade division;

e. a server in communication with the manager, general contractor and subcontractor workstations and the at least one database;

f. said server having software for a website whereby:
  i) a manager may select general contractors from the at least one database, input project information into the at least one database and send an invitation to bid to each of the selected general contractors via the manager workstation;
  ii) a general contractor may receive the invitation to bid from the manager, review the project information, select trade divisions and categories and subcontractors for the selected trade divisions and categories from the at least one database and send an invitation to bid to each of the selected subcontractors via the general contractor workstation;
  iii) a subcontractor may receive the invitation to bid from the general contractor and is presented with a website screen that includes fields generated by the software for materials unit pricing and quantity details corresponding to the trade division and categories selected for the subcontractor by the general contractor so that the subcontractor may input and submit bid information to the general contractor that must include the unit pricing and quantity details and is solely for the trade divisions and categories selected for the subcontractor by the general contractor using the subcontractor workstation; and
  iv) the general contractor may provide bid information to the manager, that must include the unit pricing and quantity details input by the subcontractor, using the general contractor workstation.

2. The system of claim 1 wherein the website also enables the subcontractor to review the project information and enter bid information into the database via the subcontractor workstation.

3. The system of claim 2 wherein the website also enables the general contractor to select subcontractor bid information from the database and generate and deliver a general contractor bid notification to the manager via the general contractor workstation for review by the manager via the manager workstation.

4. The system of claim 2 wherein the website also enables the subcontractor to send a notification to the general contractor that bid information has been entered.

5. The system of claim 1 wherein the server is in communication with the manager, general contractor and subcontractor workstations via a network.

6. The system of claim 5 wherein the network is the Internet.

7. The system of claim 1 wherein the at least one database includes a general contractor database upon which is stored the listing of general contractors and a subcontractor database upon which is stored the listing of subcontractors.

8. The system of claim 7 wherein the at least one database includes a bid database, a project database and a materials database.

9. The system of claim 1 wherein the at least one database includes a project database and a bid database.

10. The system of claim 1 wherein the invitation to bid is sent to the list of general contractors by e-mail.

11. The system of claim 10 wherein the invitation to bid is sent to the list of subcontractors by e-mail.

12. The system of claim 1 wherein the at least one database includes a bid database and a materials database, where the materials database includes materials required for each of the trade divisions and categories and the materials database is adapted to be used by the subcontractor when entering bid information into the bid database.

13. A method for providing bid information from a general contractor and a subcontractor to a manager comprising the steps of:
  a. providing a computer system including a server having software for a website, at least one database upon which is stored a listing of general contractors, a listing of subcontractors, a listing of trade divisions and a listing of categories for each trade division, and manager, general contractor and subcontractor workstations where the at least one database communicates with the server and the server communicates with the workstations over a network;
  b. the manager entering project information into the at least one database via the manager workstation and website;
  c. the manager selecting general contractors from the at least one database via the manager workstation and website;
  d. the manager sending an invitation to bid to each of the selected general contractors via the manager workstation and website;
  e. a selected general contractor reviewing the project information via the general contractor workstation and website;
  f. the selected general contractor selecting trade divisions and categories from the at least one database via the general contractor workstation and website;
  g. the selected general contractor selecting subcontractors for the selected trade divisions and categories from the at least one database via the general contractor workstation and website;
  h. the general contractor sending an invitation to bid to each of the selected subcontractors via the general contractor workstation and website;
  i. the software generating and presenting a website screen to each selected subcontractor that includes fields for materials unit pricing and quantity details corresponding to the trade division and categories selected for the subcontractor by the general contractor;
  j. a selected subcontractor inputting bid information into the website screen that must include the unit pricing and quantity details and to provide bid information to the general contractor solely for the trade division and categories selected for the subcontractor by the general contractor via the subcontractor workstation and website; and
  k. the general contractor providing bid information to the manager, that must include the unit pricing and quantity details input by the subcontractor, via the general contractor workstation and website.

14. The method of claim 13 wherein step j. includes the steps of:
  i) the subcontractor reviewing the project information via the subcontractor workstation; and
  ii) entering bid information into the database via the subcontractor workstation.

15. The method of claim 13 wherein the at least one database includes a general contractor database upon which is stored the listing of general contractors, a subcontractor database upon which is stored the listing of subcontractors and a project database.

16. The method of claim 15 wherein the at least one database also includes a bid database.

17. The method of claim 16 wherein step j. includes the subcontractor entering the bid information into the bid database.

18. The method of claim 13 wherein step j. includes the step of the subcontractor sending a notification to the general contractor and step k. includes the step of the general contractor sending a notification to the manager.

19. The method of claim 13 wherein the network is the Internet.

* * * * *